US009792564B2

(12) United States Patent
Helber et al.

(10) Patent No.: US 9,792,564 B2
(45) Date of Patent: Oct. 17, 2017

(54) AUTOMATED SYSTEM AND METHOD FOR VERTICAL GRADIENT CORRECTION

(75) Inventors: Robert W. Helber, Slidell, LA (US); Charlie N. Barron, Slidell, LA (US); Michael R. Carnes, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1345 days.

(21) Appl. No.: 13/325,398

(22) Filed: Dec. 14, 2011

(65) Prior Publication Data

US 2013/0158874 A1 Jun. 20, 2013

(51) Int. Cl.
*G06F 19/00* (2011.01)
*G06Q 10/00* (2012.01)

(52) U.S. Cl.
CPC .................................. *G06Q 10/00* (2013.01)

(58) Field of Classification Search
CPC ........ G06Q 40/04; G06Q 20/40; H04L 51/32; G01V 1/38; G01V 1/303; G01V 1/306; G01V 11/00; G01V 1/30; G01V 1/3835; G01S 15/89; G06F 17/5009
USPC .......... 702/1, 85, 108, 127, 16; 367/38, 131, 367/21, 24; 703/2, 6
See application file for complete search history.

(56) References Cited

U.S. PATENT DOCUMENTS

| | | | |
|---|---|---|---|
| 4,924,698 A * | 5/1990 | Echert et al. ............... 73/170.29 |
| 5,126,978 A * | 6/1992 | Chaum ......................... 367/135 |
| H001958 H * | 4/2001 | Haeger et al. ................... 702/2 |
| 7,869,955 B2 * | 1/2011 | Zhang et al. .................. 702/14 |
| 8,032,314 B2 * | 10/2011 | Barron et al. ................. 702/50 |
| 8,504,299 B2 * | 8/2013 | Dubberley et al. .............. 702/3 |
| 2008/0165618 A1 * | 7/2008 | Robertsson ............ G01V 1/364 367/24 |
| 2008/0277492 A1 * | 11/2008 | Cannon ....................... 239/14.1 |
| 2009/0187369 A1 * | 7/2009 | Kang et al. ................... 702/130 |
| 2010/0017176 A1 * | 1/2010 | Gangopadhyay ................ 703/5 |
| 2010/0082264 A1 * | 4/2010 | Barron et al. .................. 702/25 |
| 2013/0158874 A1 * | 6/2013 | Helber et al. ..................... 702/5 |

OTHER PUBLICATIONS

Halliwell, Evaluation of vertical coordinate and vertical mixing algorithms in the HYbrid-Coordinate Ocean Model (HYCOM) MPO/RSMAS, University of Miami, Miami, FL, Oct. 2003.*
Fujii et al., A Reconstruction of Observed Profiles in the Sea East of Japan Using Vertical Coupled Temperature-Salinity EOF Modes, Journal of Oceanography, vol. 59, pp. 173 to 186.*
(Continued)

*Primary Examiner* — Toan Le
*Assistant Examiner* — Jeffrey Aiello
(74) *Attorney, Agent, or Firm* — US Naval Research Laboratory; Scott G. Bell

(57) ABSTRACT

System and method for maintaining the observed vertical structure of ocean temperature and salinity in data assimilation systems that otherwise would produce overly smoothed ocean vertical structure. The present embodiment uses a multi-layer least squares minimization technique in which the ocean is split into layers with fundamentally different vertical gradients, and the dynamic ocean layers are constrained by the observed vertical gradients of the layer itself.

20 Claims, 6 Drawing Sheets

(56) References Cited

OTHER PUBLICATIONS

P. Brasseur, J. M. Beckers, J. M. Brankart and R. Schoenauen, Seasonal temperature and salinity fields in the Mediterranean Sea: Climatological analyses of a historical data set, Deep Sea Research Deep-Sea Research I, vol. 43. No. 2, pp. 159-192, 1996.
Michael R. Carnes, William J. Teague, and Jim L. Mitchell, Inference of Subsurface Thermohaline Structure from Fields Measurable by Satellite, Journal of Atmospheric and Oceanic Technology, vol. 11, pp. 551-556, Apr. 1994.
Martin Fischer, Multivariate projection of ocean surface data onto subsurface sections, Geophysical Research Letters, vol. 27, No. 6, pp. 755-757, Mar. 15, 2000.
Yoshuke Fuji and Masafumi Kamachi, A Reconstruction of Observed Profiles in the Sea East of Japan Using Vertical Coupled Temperature-Salinity EOF Modes, Journal of Oceanography, vol. 59, pp. 173-186, 2003.
Bruno Buongiorno Nardelli and Rosalia Santoleri, Reconstructing Synthetic Profiles from Surface Data, Journal of Atmospheric and Oceanic Technology, vol. 21, pp. 693-703, Apr. 2004.

\* cited by examiner $$cf1 \Rightarrow (x - x_b)^T B^{-1} (x - x_b)$$ — 33

$x \Rightarrow$ solution T and S $x_b \Rightarrow$ background T and S $B \Rightarrow$ background error covariance matrix

FIG. 3A PRIOR ART $$cf2 \Rightarrow (d - d_b)^T B_g^{-1} (d - d_b)$$ — 35

$d \Rightarrow$ solution T and S vertical gradients $d_b \Rightarrow$ background T and S vertical gradients $B_g \Rightarrow$ background vertical gradients error covariance matrix

FIG. 3B

AUTOMATED SYSTEM AND METHOD FOR VERTICAL GRADIENT CORRECTION

CROSS-REFERENCE TO RELATED APPLICATIONS

The present application is related by subject matter and inventors to U.S. Pat. No. 8,032,314 entitled MLD-Modified Synthetic Ocean Profiles, filed Sep. 29, 2008, issued on Oct. 4, 2011, which is incorporated by reference herein in its entirety.

BACKGROUND

Ocean temperature and salinity surface observations can be extrapolated to depths in the ocean by known methods, and the errors in performing such an extrapolation can be reduced, also according to known methods. However, vertical gradients tend to remain overly smooth. What is currently done is that the average temperature and salinity over various horizontal distances at each depth of interest are determined for normal conditions in a particular location.

Operational ocean forecasting systems rely on a relative abundance of ocean surface observations for data assimilation into numerical models. Commercial fishermen utilize ocean forecasts to identify productive fishing grounds associated with ocean fronts and other dynamic ocean features. All numerical ocean forecasts rely on data assimilation. A common component of these systems aggregates surface observations and projects surface information downward to estimate the 3-dimensional temperature and salinity structure of the global ocean. Traditionally, systems minimize analysis temperature and salinity differences from observations using a least squares minimization technique. The cost function J in equation (1), an exemplary cost function of Fujii and Kamachi, *A reconstruction of observed profiles in the sea east of Japan using vertical coupled temperature-salinity EOF modes*, J. Oceanography, 59, 2003, 173-186, includes terms that minimize the temperature and salinity differences of the analysis from the first guess and observations.

$$J = \frac{1}{2}(x - x_{fg})^T B^{-1}(x - x_{fg}) + \quad \text{I}$$
$$\frac{1}{2}(Hx - x_0)^T R^{-1}(Hx - x_0) + \quad \text{II}$$
$$\frac{1}{2r_h^2}(h(x) - h_0)^2 \quad \text{III}$$
(1)

where x represents a vector of the analysis solution temperature and salinity values being sought. The $x_{fg}$ is the first guess ocean state vector, and $x_0$ is the observations vector. The error covariances, B and R, are constructed using well known data assimilation methods. The matrix H transforms the analysis to the observation space. Term III minimizes differences of the analysis, h(x), and observed, $h_0$, sea surface height anomaly, where $r_h^2$ is the standard deviation of the sea surface height anomaly. The cost function in equation (1) provides no constraint on the vertical gradients of temperature and salinity, and the entire ocean depth is handled in one minimization.

While the system minimizes the temperature and salinity errors, vertical gradients tend to remain overly smooth and unrealistic (see FIG. 1 PRIOR ART). Variation in vertical gradients can change the acoustic transmission loss prediction as shown. Accurate representation of the vertical gradient is also important for prediction of ocean currents. What are needed are improved synthetic ocean profiles of temperature and salinity that avoid an overly smoothed ocean vertical structure. What is further needed is to more accurately predict the vertical structure of the ocean through the use of the improved synthetic ocean profiles in numerical ocean models.

SUMMARY

The system and method of the present embodiment can maintain the observed vertical structure of ocean temperature and salinity in data assimilation systems that otherwise would produce overly smoothed ocean vertical structure. Data assimilative ocean forecasting systems can more accurately predict the vertical structure of the ocean when the data they assimilate maintains the observed vertical structure. Since acoustic transmission is influenced by vertical gradients of sound speed, which is derived from temperature and salinity, and since vertical gradients also control geostrophically balanced ocean currents, the present teachings can be of particular use in applications where these parameters are important. The present embodiment uses a multi-layer least squares minimization technique in which the ocean is split into layers with fundamentally different vertical gradients, and the dynamic ocean layers are constrained by the observed vertical gradients of the layer itself.

The system for constructing synthetic ocean profiles can include, but is not limited to including, an ocean property identifier automatically identifying ocean property data related to an ocean location, an ocean layer processor automatically splitting the ocean into a plurality of layers throughout the depth of the ocean at the ocean location, an interface processor identifying an interface between each of the plurality of layers, each of the interfaces occurring at an interface ocean depth, a constraint processor automatically computing constraints based on the vertical gradient of the ocean property data and other constraints in each of the plurality of layers, a dynamic layer processor creating a dynamic layer profile based on the constraints and a cost function, a surface/deep ocean processor creating at least one layer profile based on the constraints and the dynamic layer profile, a profile creator automatically combining the dynamic layer profile and the at least one layer profile to construct the synthetic ocean profile, and a computer-readable medium receiving the synthetic ocean profile.

The method for constructing synthetic ocean profiles can include, but is not limited to including, the steps of automatically identifying ocean property data related to an ocean location, automatically splitting the ocean into a plurality of layers throughout the depth of the ocean at the ocean location, identifying an interface between each of the plurality of layers, each of the interfaces occurring at an interface ocean depth, automatically computing constraints based on the vertical gradient of the ocean property data and other constraints in each of the plurality of layers, automatically applying the constraints in each of the plurality of layers to produce layer profiles, automatically combining the layer profiles to construct the synthetic ocean profiles, and automatically providing the synthetic ocean profiles to computer readable media.

Accurate representation of the observed ocean vertical gradients results in substantial improvement for acoustic transmission compared to traditional overly smoothed synthetic ocean profiles. The ocean mixed and sonic layer depths are made more accurate by ensuring a nearly isotropic surface layer and correct shape for the transition from the mixed layer to the dynamic interior. The sonic layer depth is important for acoustic applications, and the mixed layer depth is an important component of air-sea interactions that influences everything from the subrnesoscale ocean variability to global climate. Interactions of the ocean surface with the interior are more accurately represented by the system of the present embodiment since the dynamic layer constraints preserve the Observed vertical gradients of the transition layer. Accurate representation of the subsurface layer is important for global water mass interactions and the thermohaline circulation. Accurate vertical gradients below the surface have the advantage of more accurately representing acoustic convergence zones and deep ocean acoustic transmission.

BRIEF DESCRIPTION OF THE DRAWINGS

FIG. 3A PRIOR ART is a conventional cost function equation based on temperature and salinity;

FIG. 3B is a cost function of the present embodiment based on vertical gradients;

DETAILED DESCRIPTION

Figure 1:
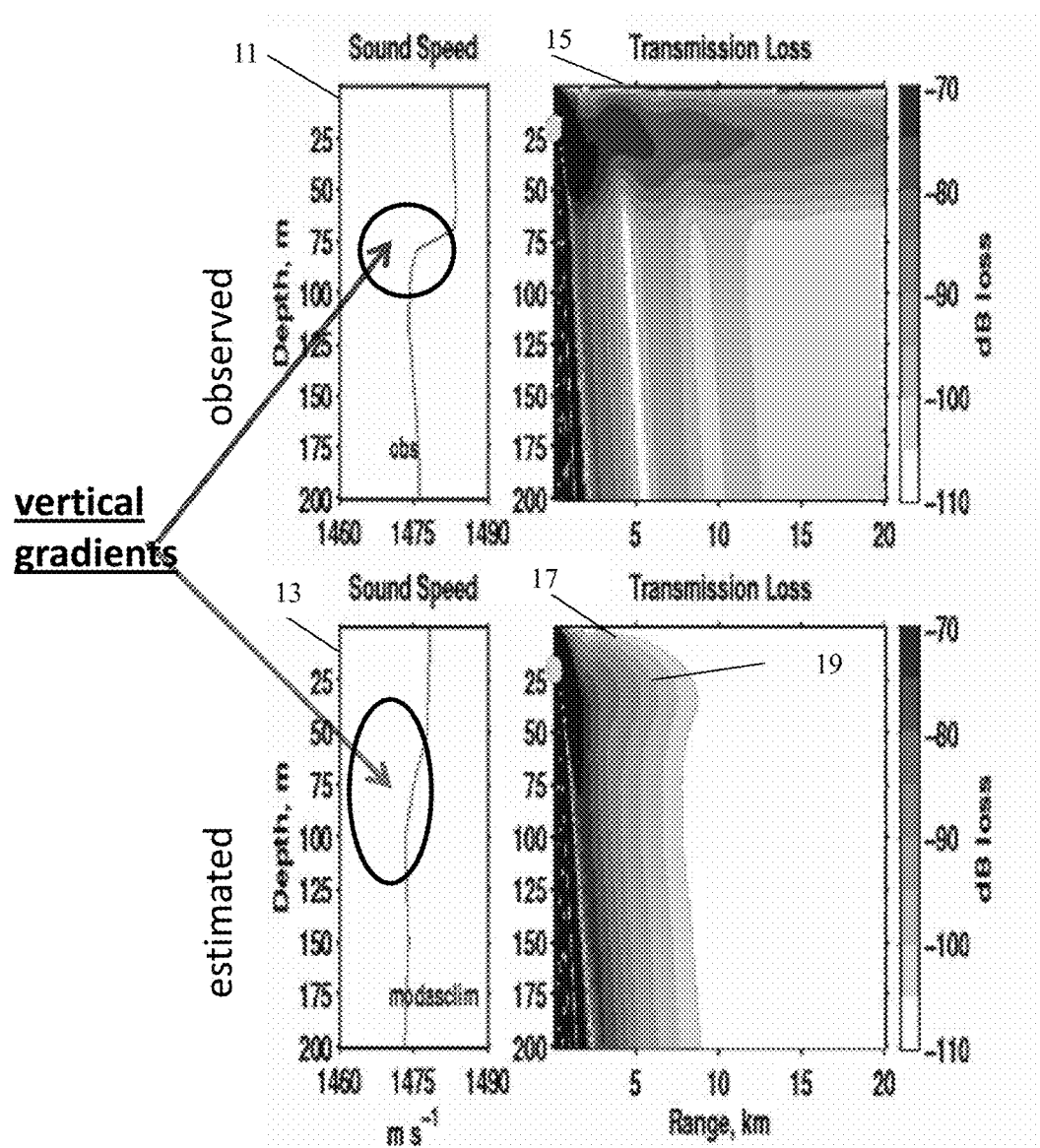
FIG. 1 PRIOR ART is a graphical representation of observed and estimated sound speed and transmission loss.

The problems set forth above, as well as further and other problems, are solved by the present teachings. These solutions and other advantages are achieved by the various embodiments of the teachings described herein below.

The multi-layer ocean vertical gradient constraints system of the present embodiment provides estimates of the subsurface temperature and salinity ocean structure used in data assimilation systems.

The input for the system can include recent ocean observations, and the output can be 3-dimensional for anywhere in the global ocean. Generated ocean temperature and salinity estimates are referred to as synthetics and can be created using a multi-layer least squares minimization technique. Important aspects of the system can include splitting the ocean into layers with fundamentally different vertical gradients, and constraining dynamic ocean layers by the observed vertical gradients of the layers themselves.

For example, the ocean can include a surface layer that is nearly isotropic from the ocean surface to the bottom of the mixed layer (mixed layer depth) where large vertical gradients often occur, a dynamic layer that extends from the mixed layer depth to 1000 meters, for example, and implements vertical gradient constraints, and a deep ocean layer that uses a decay scheme to blend the second layer synthetics with climatology below 1000 meters, for example. The density of the surface layer can match the vertical density gradient of the dynamic layer at the mixed layer depth and can have an overall density change less than $\sigma_{\theta,thresh}$ (for example, but not limited to $\sigma_{\theta,thresh}$=0.15 kg/m³). Coefficients for the mixed layer reconstruction can be created by minimizing the difference between scaled potential density anomalies and a model of scaled potential density anomalies derived from the mixed layer depth (MLD) and the potential density gradient at the mixed layer depth. The observed scaled potential density gradient is scaled by the mixed layer threshold potential density change $\sigma_{\theta,thresh}$, and is given by $$\overline{\Delta}\hat{\sigma}_\theta(z') = \frac{\hat{\sigma}_\theta(z') - \hat{\sigma}_\theta(1)}{\sigma_{\theta,thresh}}, \quad (2)$$

where the hat symbol on top of $\sigma_\theta$ indicates that $\hat{\sigma}_\theta(z')$ is the potential density as a function of scaled depth $z'=z/MLD$, $\hat{\sigma}_\theta(1)$ is the potential density at the MLD, and $\overline{\Delta}$ denotes a scaled difference. The model for the scaled potential density anomaly is a polynomial equation given by $$\overline{\Delta}\hat{\sigma}_\theta^M(z',G_{MLD}, MLD) = a_1(z') + a_2(z')G_{MLD} + a_3(z')G_{MLD}^2 + a_4(z')MLD + a_5(z')MLD^2 + a_6(z')G_{MLD}MLD + a_7(z')G_{MLD}^2MLD + a_8(z')G_{MLD}MLD^2 \quad (3)$$

where the potential density gradient at the MLD is $$G_{MLD} = \frac{\partial \sigma_\theta / \partial z |_{z=MLD}}{\sigma_{\theta,thresh}}, \quad (4)$$

and the coefficients being sought, $a_1, a_2, \ldots a_8$, are functions of scaled depth, $z'$. The coefficients are computed by minimizing the sum $$\sum_{i=1}^{N} (\overline{\Delta}\hat{\sigma}_\theta^M(z'_k, G_{MLD,i}, MLD_i) - \overline{\Delta}\hat{\sigma}_{\theta,i}(z'_k))^2 \quad (5)$$

for N observations of $G_{MLD,i}$, and $MLD_i$, and $\overline{\Delta}\hat{\sigma}_{\theta,i}(z'_k)$ and for a set of K scaled depths given by $$z'_k = \frac{1 + \log_{10}(0.1 + 0.05(k-1))}{1 + \log_{10}(1.1)}, \quad (6)$$

which provide wider spacing near the surface and finer spacing near the MLD ($z'=1$). The second set of coefficients is created by minimizing the sum of differences $$\sum_{i=1}^{N} \left[ (a_T(z'_k)(\hat{\sigma}_{\theta,i}(z'_k) - \hat{\sigma}_{\theta,i}(1))) - (\hat{\theta}_i(z'_k) - \hat{\theta}_i(1)) \right]^2 \quad (7)$$

with respect to the coefficients, $a_T$, for temperature, where $\hat{\theta}_i$ is the i-th of N historical in situ temperature observations. For salinity, the minimization is $$\sum_{i=1}^{N} \left[ (a_S(z'_k)(\hat{\sigma}_{\theta,i}(z'_k) - \hat{\sigma}_{\theta,i}(1))) - (\hat{S}_i(z'_k) - \hat{S}_i(1)) \right]^2, \quad (8)$$

where $\hat{S}_i$ the i-th of N historical in situ salinity observations. The final synthetic temperature and salinity profiles are created by using the first set of coefficients ($a_1, a_2, \ldots a_8$) to construct the modeled potential density $\hat{\sigma}_\theta^M$ to be used with the second set of coefficients to create the synthetic temperature and salinity values in Layer 1. Mathematically, these values are computed using $$\hat{\theta}(z_k')=\hat{\theta}(1)+a_T(z_k')(\hat{\sigma}_\theta^M(z_k')-\hat{\sigma}_\theta(1)) \quad (9)$$

and $$\hat{S}(z_k')=\hat{S}(1)+a_S(z_k')(\hat{\sigma}_\theta^M(z_k')-\hat{\sigma}_\theta(1)). \quad (10)$$

In equations (9) and (10), $\hat{\sigma}_\theta^M$ is the potential density computed using equation (3) and $\hat{\sigma}_\theta^M(z')=\sigma_{\theta,thresh} \overline{\Delta \hat{\sigma}_\theta^M}(z')+\hat{\sigma}_\theta^M(1)$, $\hat{\theta}(1)$ is an input potential temperature observation translated to the MLD, $\hat{\sigma}_\theta(1)$ is the potential density at the MLD from the second layer analysis, and $\hat{S}(1)$ is the salinity at the MLD computed from the temperature and salinity ratio for that location. A key aspect of the surface layer is that the density gradient at the base of the mixed layer is constrained by what is historically observed.

Below the mixed layer, the dynamic layer can represent the dynamical variability of the ocean transition layer which connects the surface layer with the interior. To capture the variability of the dynamic layer, the synthetic profiling system can employ a cost function as follows:

$$\begin{aligned}
J = \quad & (x-x_b)^T B^{-1}(x-x_b)+ & \text{I} \quad (11)\\
& (d-d_b)^T E^{-1}(d-d_b)+ & \text{II}\\
& (x_{fg}-x)^T R^{-1}(x_{fg}-x)+ & \text{III}\\
& (d_{fg}-d)^T P^{-1}(d_{fg}-d)+ & \text{IV}\\
& \sum_{i=1}^{N}\left(\frac{T_i'-\hat{T}_i'}{u_i}\right)^2 + & \text{V}\\
& \sum_{i=1}^{N-1}\left(\frac{(T_{i+1}'-T_i')-(\hat{T}_{i+1}'-\hat{T}_i')}{w_i}\right)^2 + & \text{VI}\\
& \sum_{i=1}^{N}\left(\frac{S_i'-\hat{S}_i'}{u_{i+N}}\right)^2 + & \text{VII}\\
& \sum_{i=1}^{N-1}\left(\frac{(S_{i+1}'-S_i')-(\hat{S}_{i+1}'-\hat{S}_i')}{w_{i+N-1}}\right)^2 + & \text{VIII}\\
& \frac{(\tilde{T}_{MLD}'-\hat{T}_{MLD}')^2}{\varepsilon_{SST}^2} + & \text{IX}\\
& \frac{(\tilde{h}_{MLD}-\hat{h}_{MLD})^2}{\varepsilon_h^2} + & \text{X}\\
& \sum_{j=1}^{N_T}\frac{(\tilde{T}_{i_T(j)}'-\hat{T}_{i_T(j)}')^2}{\varepsilon_{T,i_T(j)}^2} + & \text{XI}\\
& \sum_{j=1}^{N_S}\frac{(\tilde{S}_{i_S(j)}'-\hat{S}_{i_S(j)}')^2}{\varepsilon_{S,i_S(j)}^2} & \text{XII}
\end{aligned}$$

The temperature and salinity analysis solution being sought in equation (11) is represented as the vector x. The background and first guess temperature and salinity vectors are $x_b$ and $x_{fg}$ respectively. The analysis solution temperature and salinity vertical gradients, computed as the differences at consecutive depth levels, are represented as the vector d. The vertical gradients for the background and the first guess are vectors $d_b$ and $d_{fg}$ respectively. The error covariance matrices B, E, R, and P, in terms I, II, III, and IV of equation (11), can be computed using well known data assimilation methods. In equation (11), E and P are vertical gradients error covariance matrices, compared to B and R in equation (1) and (11) which are simply error covariance matrices. Terms II and IV do not exist in prior art. The four terms V, VI, VII, and VIII constrain the analysis solution to the system's principal component representation of the ocean. Terms IX and X constrain the analysis to the temperature at the mixed layer depth and the steric height anomaly at the mixed layer depth, respectively. Terms XI and XII constrain the analysis to the temperature and salinity as observed anywhere in the ocean near the location of the synthetic.

The terms in the dynamic layer cost function of equation (11) that provide the ocean vertical gradient constraints are II, IV, VI, and VIII. Term II constrains the vertical gradients of the analysis solution to the background vertical gradients. Term IV constrains the vertical gradients of the analysis solution to the first guess vertical gradients. The terms that constrain the analysis to the principal component vertical gradients are term VI for temperature and term VIII for salinity.

The deep ocean layer relies on an ocean temperature and salinity climatology that extends to the ocean bottom. The deep ocean layer temperature and salinity analysis values at 1000 meters are equal to the dynamic level values at 1000 meters. Gradually with depths below 1000 meters, the deep ocean layer analysis values approach climatology using an exponential decay scheme.

Together, the nearly isotropic surface layer, the dynamic layer, and the nearly climatological deep ocean layer are combined to produce synthetic temperature and salinity profiles. Both the multi-layer structure and the vertical gradients constraints of the surface and dynamic layers preserve the observed vertical gradients of the ocean, while the deep ocean layer follows the typically tight gradient constraint for water masses in the ocean depths. The general multi-layer ocean vertical gradient constraints methodology can be applied globally.

In summary, the present embodiment constrains temperature and salinity to the vertical gradient of the background ocean field (see term I of equation (11)), whereas the prior art constrains temperature and salinity to the background ocean field (see term I, equation (1)). The surface layer is constructed to match the vertical density gradient of the dynamic layer at the MLD. This gradient is constrained by what is historically observed. The synthetic values gradually with depth approach climatology using an exponential decay scheme. Together, the three layers are combined to produce synthetic temperature and salinity profiles. Both the multi-layer structure and the vertical gradient constraints ensure that the synthetic profiles accurately represent the actual vertical gradients of the ocean. Synthetics can accurately represent the vertical gradients of the ocean. The system of the present embodiment can generate stand-alone synthetics where synthetics are produced on demand anywhere in the ocean, and data assimilation, where synthetics are produced within a data assimilative ocean forecasting system.

Referring now to FIG. 1 (PRIOR ART), observed sound speed profile 11 varying with ocean depth is related as shown to observed acoustic transmission loss 15 for depth versus range. Observed sound speed profile 11 has a strong, deep vertical gradient. Synthetic sound speed profile 13 from a legacy data assimilation system is related as shown to synthetic acoustic transmission loss 17. Synthetic sound speed profile 13 is too smooth and shallow, and results in a drastically reduced surface acoustic duct 19 seen by the lack of low dB loss near the surface in synthetic acoustic transmission loss 17 as compared to observed acoustic transmission loss 15. The present embodiment can produce more accurate synthetic vertical gradients in sound speed, thereby producing more accurate acoustic transmission loss estimates.

Figure 2:
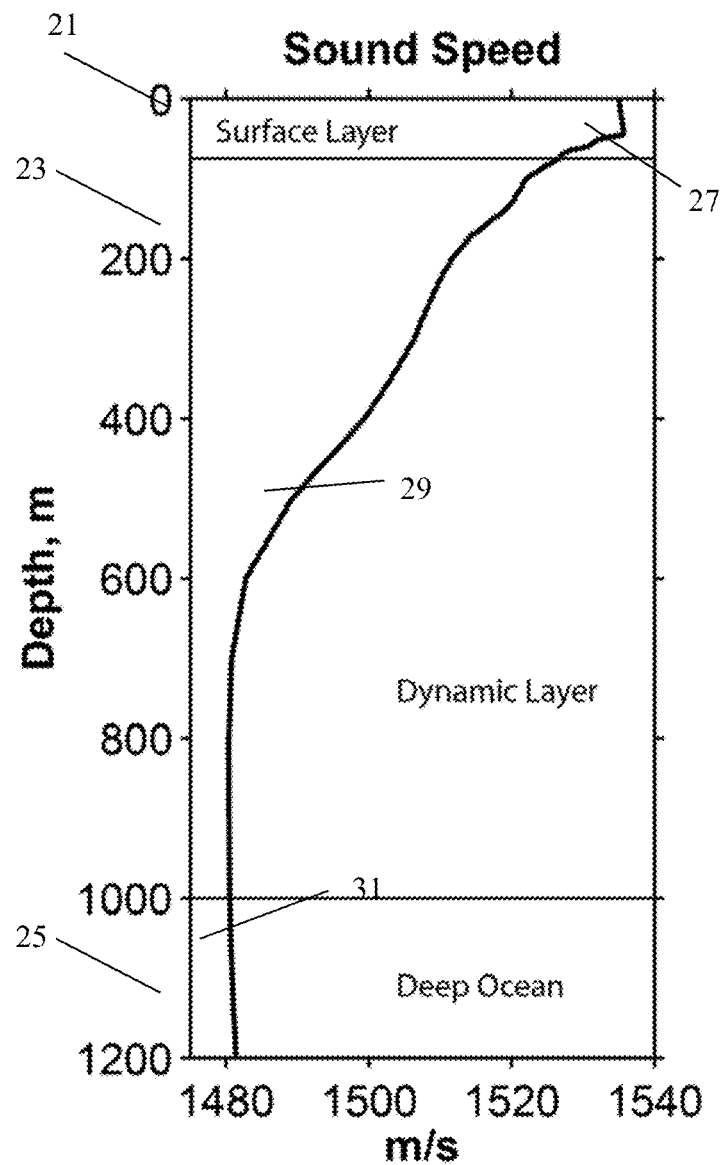
FIG. 2 is a graphical representation of a sound speed profile through surface, dynamic, and deep ocean layers.

Referring now to FIG. 2, the present embodiment can be configured in, for example, but not limited to, three layers. Surface layer 21 encompasses the top portion of the ocean boundary layer where temperature and salinity tend to be vertically uniform as shown in surface profile section 27. Dynamic layer 23 is the portion of the ocean that drives ocean currents and is dynamically variable as shown in dynamic profile section 29. Deep ocean layer 25 extends from approximately 1000 m to the ocean bottom and is less variable as shown in deep profile section 31.

Referring now to FIG. 3A (PRIOR ART), in the prior art, cost function cf1 33 constrains the solution to temperature and salinity values. Referring now to FIG. 3B, in the present embodiment, cost function cf2 35 constrains the solution to the vertical gradient of T and S values. In both cf1 33 and cf2 35, the solution is constrained to the background climatological (average) vertical T and S structure of the ocean.

Figure 4:
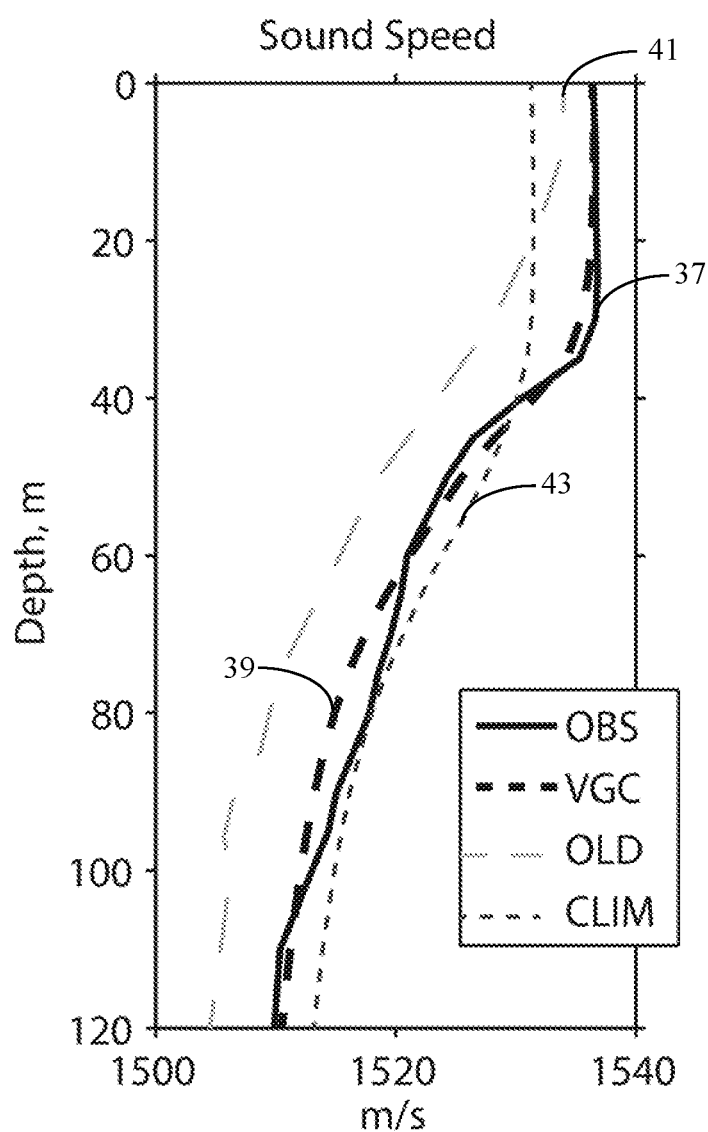
FIG. 4 is a graphical representation of observed, climatological, priort art, and present embodiment sound speed profiles.

Referring now to FIG. 4, observed profile 37 can be seen to be most closely aligned with synthetic profile 39 obtained using cost function cf2 35 (FIG. 3) of the present embodiment. Legacy synthetic profile 41, obtained using cost function similar to cf1 33 (FIG. 3), and climatological profile 43 are both less true to observed profile 37 than synthetic profile 39.

Figure 5:
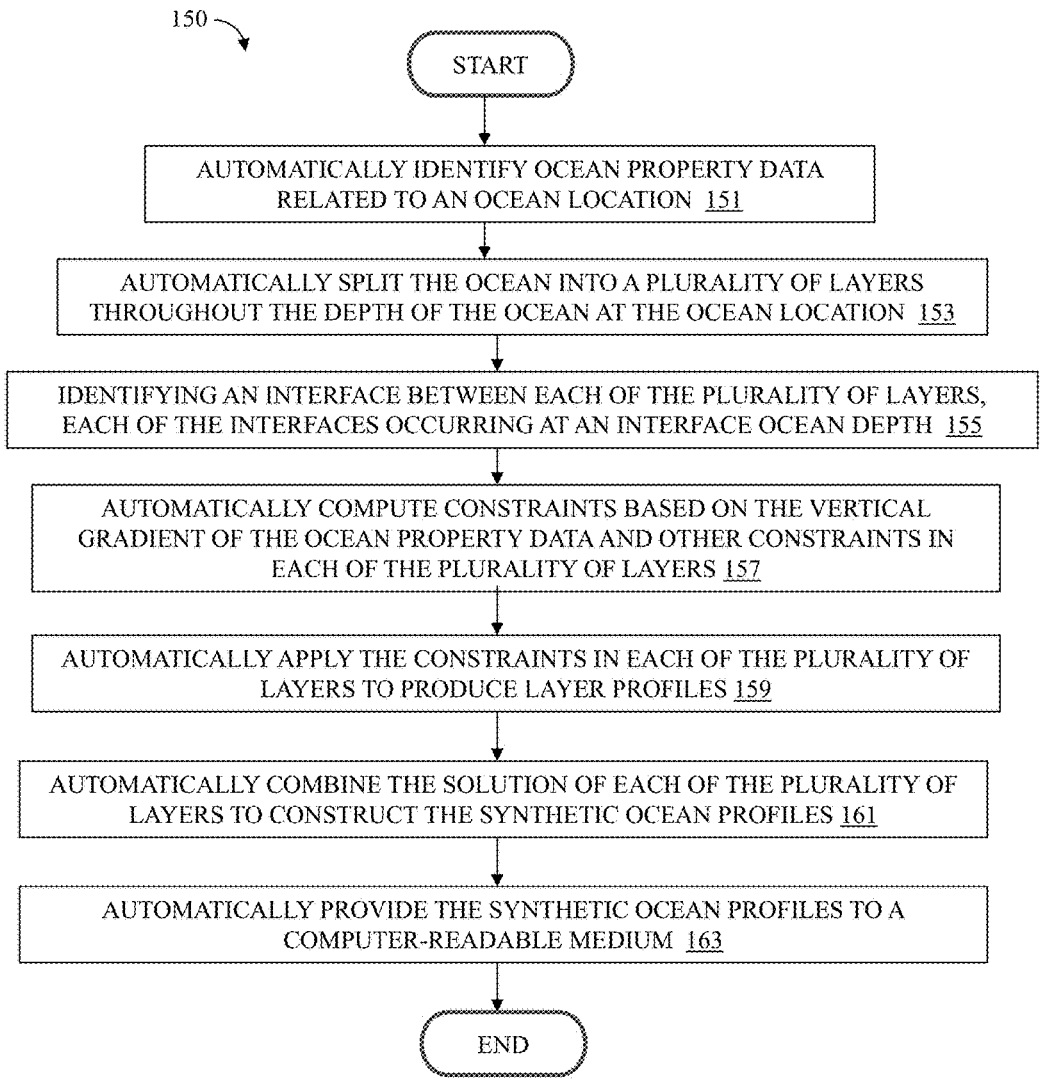
FIG. 5 is a flowchart of the method of the present teachings.
Figure 6:
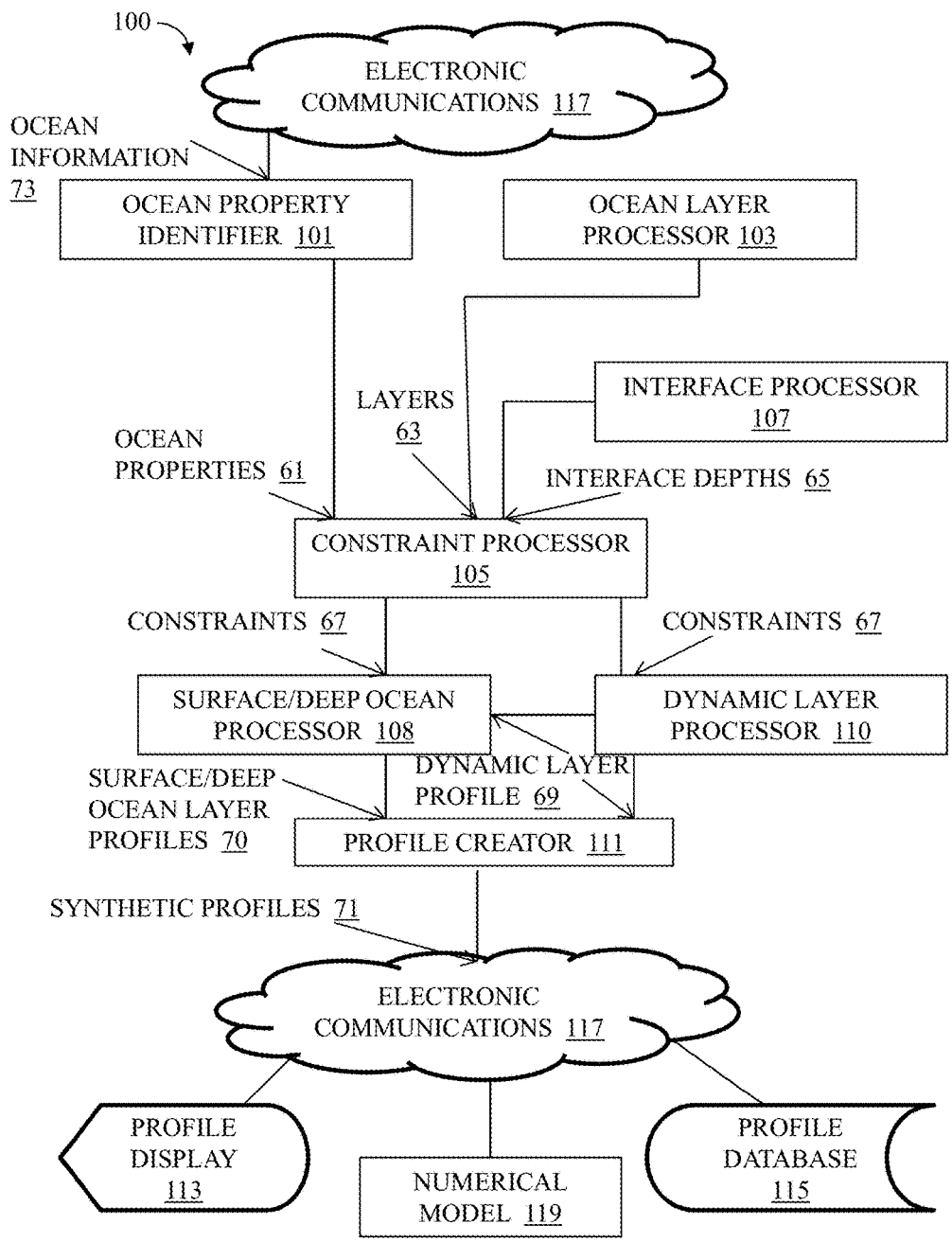
FIG. 6 is a schematic block diagram of the system of the present teachings.

Referring now to FIG. 5, method 150 for constructing synthetic ocean profiles 71 (FIG. 6) can include, but is not limited to including, the steps of automatically identifying 151 ocean property data 61 (FIG. 6) related to an ocean location, automatically splitting 153 the ocean into plurality of layers 63 (FIG. 6) throughout the depth of the ocean at the ocean location, identifying 155 an interface between each of plurality of layers 63 (FIG. 6), each of the interfaces occurring at interface ocean depth 65 (FIG. 6), automatically computing 157 constraints 67 (FIG. 6) based on the vertical gradient of ocean property data 61 (FIG. 6) and other constraints in each of plurality of layers 63 (FIG. 6), automatically applying 159 constraints 67 (FIG. 6) in each of plurality of layers 63 (FIG. 6), automatically combining 161 the constrained layers to construct synthetic ocean profiles 71 (FIG. 6), and automatically providing 163 synthetic ocean profiles 71 (FIG. 6) to computer readable media, for example, but not limited to, profile display 113 (FIG. 6), numerical model 119 (FIG. 6), and profile database 115 (FIG. 6). The plurality of layers 63 (FIG. 6) can include, but is not limited to including, a surface layer, the surface layer having a surface layer temperature profile and a surface layer salinity profile, a dynamic layer, the dynamic layer having a dynamic layer temperature profile and a dynamic layer salinity profile, and a deep ocean layer, the deep ocean layer having a deep ocean temperature profile and deep ocean salinity profile. The step of splitting the ocean can include, but is not limited to including, the step of computing interface ocean depths 65 (FIG. 6) based on ocean property data 61 (FIG. 6). Method 150 can further include the steps of selecting ocean property data 61 (FIG. 6) from a group consisting of ocean temperature (T), ocean salinity (S), sea surface temperature (SST), sea surface height (SSH), and mixed layer depth (MLD), automatically computing a first layer profile for one of the plurality of layers 63 (FIG. 6) based on a cost function and constraints 67 (FIG. 6), automatically computing at least one other profile for another of the plurality of layers 63 (FIG. 6) based on the first layer profile and constraints 67 (FIG. 6), and selecting constraints 67 (FIG. 6) from a group consisting of climatological temperature and salinity fields, vertical gradient of the climatological temperature and salinity fields, first guess temperature and salinity fields, vertical gradient of the first guess temperature and salinity fields, plurality of EOF-mode representation of the temperature and salinity fields, vertical gradient of the plurality of EOF-mode representation of the temperature and salinity fields, observed temperature at the mixed layer depth, observed sea surface height anomaly, observed subsurface temperature, and observed subsurface salinity.

The cost function can include, but is not limited to including, $$
\begin{aligned}
J = \quad & (x - x_b)^T B^{-1}(x - x_b) + & \text{I} \\
& (d - d_b)^T E^{-1}(d - d_b) + & \text{II} \\
& (x_{fg} - x)^T R^{-1}(x_{fg} - x) + & \text{III} \\
& (d_{fg} - d)^T P^{-1}(d_{fg} - d) + & \text{IV} \\
& \sum_{i=1}^{N} \left(\frac{T'_i - \hat{T}'_i}{u_i}\right)^2 + & \text{V} \\
& \sum_{i=1}^{N-1} \left(\frac{(T'_{i+1} - T'_i) - (\hat{T}'_{i+1} - \hat{T}'_i)}{w_i}\right)^2 + & \text{VI} \\
& \sum_{i=1}^{N} \left(\frac{S'_i - \hat{S}'_i}{u_{i+N}}\right)^2 + & \text{VII} \\
& \sum_{i=1}^{N-1} \left(\frac{(S'_{i+1} - S'_i) - (\hat{S}'_{i+1} - \hat{S}'_i)}{w_{i+N-1}}\right)^2 + & \text{VIII} \\
& \frac{(\tilde{T}'_{MLD} - \hat{T}'_{MLD})^2}{\varepsilon_{SST}^2} + & \text{IX} \\
& \frac{(\tilde{h}_{MLD} - \hat{h}_{MLD})^2}{\varepsilon_{h}^2} + & \text{X} \\
& \sum_{j=1}^{N_T} \frac{(\tilde{T}'_{i_T(j)} - \hat{T}'_{i_T(j)})^2}{\varepsilon_{T,i_T(j)}^2} + & \text{XI} \\
& \sum_{j=1}^{N_S} \frac{(\tilde{S}'_{i_S(j)} - \hat{S}'_{i_S(j)})^2}{\varepsilon_{S,i_S(j)}^2} & \text{XII}
\end{aligned}
$$

Method 150 can further include the step of automatically computing the surface layer temperature profile and the surface layer salinity profile based on a first guess temperature profile, a first guess salinity profile, the ocean property data, the dynamic layer temperature profile, and the dynamic layer salinity profile; automatically computing the surface layer temperature profile and the surface layer salinity profile based on mixed layer structure coefficients; automatically constructing surface layer profile 70 (FIG. 6) to match ocean property data 61 (FIG. 6) and subsurface layer properties at the MLD; and automatically constructing deep ocean layer 70 (FIG. 6) based on an exponential decay scheme between subsurface layer properties adjacent to deep ocean layer 70 (FIG. 6) and deep ocean climatological data.

Referring now to FIG. 6, system 100 for constructing synthetic ocean profiles 71 can include, but is not limited to including, ocean property identifier 101 receiving ocean information 73, for example from electronic communications 117, and automatically identifying ocean property data 61 related to an ocean location. System 100 can further include ocean layer processor 103 automatically splitting the ocean into a plurality of layers 63 throughout the depth of the ocean at the ocean location, interface processor 107 identifying an interface between each of the plurality of layers 63, each of the interfaces occurring at interface ocean depth 65, constraint processor 105 automatically computing constraints 67 based on the vertical gradient of ocean property data 61 and other constraints in each of the plurality of layers 63, dynamic layer processor 110 creating a dynamic layer profile based on the constraints and a cost function, surface/deep ocean processor 108 creating at least one layer profile based on the constraints and the dynamic layer profile, profile creator 111 automatically combining the dynamic layer profile 69 and the at least one layer profile to construct the synthetic ocean profile 71, and a computer-readable medium such as, for example, but not limited to, profile display 113, numerical model 119, and profile database 115, receiving synthetic ocean profiles 71. The plurality of layers 63 can include, but is not limited to including, a surface layer, the surface layer having a surface layer temperature profile and a surface layer salinity profile, a dynamic layer, the dynamic layer having a dynamic layer temperature profile and a dynamic layer salinity profile, and a deep ocean layer, the deep ocean layer having a deep ocean temperature profile and deep ocean salinity profile.

Ocean layer processor 103 can compute each interface ocean depth 65 based on ocean property data 61. Ocean property identifier 101 can select ocean property data 61 from a group consisting of ocean temperature (T), ocean salinity (S), sea surface temperature (SST), sea surface height (SSH), and mixed layer depth (MLD). Constraint processor 105 can select constraints 67 from a group consisting of climatological temperature and salinity fields, vertical gradient of the climatological temperature and salinity fields, first guess temperature and salinity fields, vertical gradient of the first guess temperature and salinity fields, plurality of EOF-mode representation of the temperature and salinity fields, vertical gradient of the plurality of EOF-mode representation of the temperature and salinity fields, observed temperature at the mixed layer depth, observed sea surface height anomaly, observed subsurface temperature, and observed subsurface salinity. The cost function can include, but is not limited to including, $$J = (x - x_b)^T B^{-1} (x - x_b) + \quad \text{I}$$

$$(d - d_b)^T E^{-1} (d - d_b) + \quad \text{II}$$

$$(x_{fg} - x)^T R^{-1} (x_{fg} - x) + \quad \text{III}$$

$$(d_{fg} - d)^T P^{-1} (d_{fg} - d) + \quad \text{IV}$$

$$\sum_{i=1}^{N} \left( \frac{T'_i - \hat{T}'_i}{u_i} \right)^2 + \quad \text{V}$$

$$\sum_{i=1}^{N-1} \left( \frac{(T'_{i+1} - T'_i) - (\hat{T}'_{i+1} - \hat{T}'_i)}{w_i} \right)^2 + \quad \text{VI}$$

$$\sum_{i=1}^{N} \left( \frac{S'_i - \hat{S}'_i}{u_{i+N}} \right)^2 + \quad \text{VII}$$

$$\sum_{i=1}^{N-1} \left( \frac{(S'_{i+1} - S'_i) - (\hat{S}'_{i+1} - \hat{S}'_i)}{w_{i+N-1}} \right)^2 + \quad \text{VIII}$$

-continued $$\frac{(\tilde{T}'_{MLD} - \hat{T}'_{MLD})^2}{\varepsilon_{SST}^2} + \quad \text{IX}$$

$$\frac{(\tilde{h}_{MLD} - \hat{h}_{MLD})^2}{\varepsilon_h^2} + \quad \text{X}$$

$$\sum_{j=1}^{N_T} \frac{(\tilde{T}'_{i_T(j)} - \hat{T}'_{i_T(j)})^2}{\varepsilon_{T,i_T(j)}^2} + \quad \text{XI}$$

$$\sum_{j=1}^{N_S} \frac{(\tilde{S}'_{i_S(j)} - \hat{S}'_{i_S(j)})^2}{\varepsilon_{S,i_S(j)}^2} \quad \text{XII}$$

Profile creator 111 can automatically compute the surface layer temperature profile and the surface layer salinity profile based on a first guess temperature profile, the first guess salinity profile, ocean property data, the dynamic layer temperature profile, and the dynamic layer salinity profile. Profile creator 111 can alternatively automatically compute the surface layer temperature profile and the surface layer salinity profile based on the ocean property data, the dynamic layer temperature profile, the dynamic layer salinity profile, and mixed layer structure coefficients. Profile creator 111 can automatically compute the surface layer profile to match the ocean property data and properties of a subsurface layer at the MLD. Profile creator 111 can automatically compute the deep ocean layer profile based on an exponential decay scheme between the properties of a subsurface layer adjacent to the deep ocean layer and deep ocean climatological data.

Raw data and results from the computations of the present embodiment can be stored for future retrieval and processing, printed, displayed, transferred to another computer, and/or transferred elsewhere. Electronic communications 117 (FIG. 6) from which ocean data 61 (FIG. 6) can be received and through which synthetic profiles 71 (FIG. 6) can be transmitted can be wired or wireless, for example, using cellular communication systems, military communications systems, and satellite communications systems. The software for the system is written in a variety of conventional programming languages. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIG. 5, method 150 can be, in whole or in part, implemented electronically. Signals representing actions taken by elements of system 100 (FIG. 6) and other disclosed embodiments can travel over at least one live communications network. Control and data information can be electronically executed and stored on at least one computer-readable medium. The system can be implemented to execute on at least one computer node in at least one live communications network. Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A computer-implemented method for constructing synthetic sound speed profiles comprising the steps of:
   identifying ocean observational data that includes temperature and salinity measurements for an ocean location;
   generating, based on the ocean observation data, a plurality of layers throughout the depth of the ocean at the ocean location, wherein the plurality of layers includes a surface layer, a mixed layer, a dynamic layer, and a deep ocean layer;
   identifying an interface between each of the plurality of layers, each of the interfaces occurring at an interface ocean depth;
   applying a dynamic layer cost function to the dynamic layer to compute vertical gradient constraints based on a vertical gradient of the ocean observational data and other constraints in each of the plurality of layers, wherein the vertical gradient constraints are incorporated into the synthetic sound speed profiles;
   applying the vertical gradient constraints in each of the plurality of layers to constrain corresponding layer profiles of each of the plurality of layers, wherein the vertical gradient constraints include:
     first guess temperature and salinity fields for constraining the surface layer,
     observed temperature at the mixed layer depth for constraining the mixed layer, and
     observed subsurface temperature and salinity for constraining the deep ocean layer;
   combining the constrained layer profiles of each of the plurality of layers to construct the synthetic sound speed profiles, wherein each of the synthetic sound speed profiles is aligned to a corresponding observed profile within less than 8 meters per second;
   using the synthetic sound speed profiles to generate a three-dimensional synthetic model of temperature and salinity at the ocean location, wherein each of the plurality of layers represented in the three-dimensional synthetic model is constrained by at least one of the vertical gradient constraints; and
   generating an ocean forecast that accounts for the vertical gradient based on the three-dimensional synthetic model.

2. The method as in claim 1 wherein
   the surface layer has a surface layer temperature profile and a surface layer salinity profile;
   the dynamic layer has a dynamic layer temperature profile and a dynamic layer salinity profile; and
   the deep ocean layer has a deep ocean temperature profile and deep ocean salinity profile.

3. The method as in claim 1 wherein the step of generating the plurality of layers comprises the step of:
   computing each of the interface ocean depths based on the ocean observational data.

4. The method as in claim 1 wherein the vertical gradient constraints constrain the vertical gradient to at least one gradient selected from a group consisting of background gradients, first guess gradients, empirical orthogonal function (EOF) mode temperature vertical gradients, and EOF-mode salinity vertical gradients.

5. The method as in claim 4 further comprising the steps of:
   computing a first layer profile for one of the plurality of layers based on the dynamic layer cost function and the vertical gradient constraints;
   computing at least one other profile for another of the plurality of layers based on the first layer profile and the vertical gradient constraints; and
   selecting the vertical gradient constraints from a group consisting of climatological temperature and salinity fields, vertical gradient of the climatological temperature and salinity fields, the first guess temperature and salinity fields, vertical gradient of the first guess temperature and salinity fields, plurality of EOF-mode representation of the temperature and salinity fields, vertical gradient of the plurality of EOF-mode representation of the temperature and salinity fields, the observed temperature at the mixed layer depth, observed sea surface height anomaly, the observed subsurface temperature, and observed subsurface salinity.

6. The method as in claim 5 wherein the dynamic layer cost function comprises:

$$J = (x - x_b)^T B^{-1} (x - x_b) + \quad \text{I}$$

$$(d - d_b)^T E^{-1} (d - d_b) + \quad \text{II}$$

$$(x_{fg} - x)^T R^{-1} (x_{fg} - x) + \quad \text{III}$$

$$(d_{fg} - d)^T P^{-1} (d_{fg} - d) + \quad \text{IV}$$

$$\sum_{i=1}^{N} \left( \frac{T'_i - \hat{T}'_i}{u_i} \right)^2 + \quad \text{V}$$

$$\sum_{i=1}^{N-1} \left( \frac{(T'_{i+1} - T'_i) - (\hat{T}'_{i+1} - \hat{T}'_i)}{w_i} \right)^2 + \quad \text{VI}$$

$$\sum_{i=1}^{N} \left( \frac{S'_i - \hat{S}'_i}{u_{i+N}} \right)^2 + \quad \text{VII}$$

$$\sum_{i=1}^{N-1} \left( \frac{(S'_{i+1} - S'_i) - (\hat{S}'_{i+1} - \hat{S}'_i)}{w_{i+N-1}} \right)^2 + \quad \text{VIII}$$

$$\frac{(\hat{T}'_{MLD} - \hat{T}'_{MLD})^2}{\varepsilon_{SST}^2} + \quad \text{IX}$$

$$\frac{(\tilde{h}_{MLD} - \hat{h}_{MLD})^2}{\varepsilon_h^2} + \quad \text{X}$$

$$\sum_{j=1}^{N_T} \frac{(\tilde{T}'_{i_T(j)} - \hat{T}'_{i_T(j)})^2}{\varepsilon_{T,i_T(j)}^2} + \quad \text{XI}$$

$$\sum_{j=1}^{N_S} \frac{(\tilde{S}'_{i_S(j)} - \hat{S}'_{i_S(j)})^2}{\varepsilon_{S,i_S(j)}^2} \quad \text{XII.}$$

7. The method as in claim 6 wherein:
term II of the dynamic layer cost function is a first constraint of the vertical gradient constraints for constraining the vertical gradient to the background gradients;
term IV of the dynamic layer cost function is a second constraint of the vertical gradient constraints for constraining the vertical gradient to the first guess gradients;
term VI of the dynamic layer cost function is a second constraint of the vertical gradient constraints for constraining analysis to the EOF-mode temperature vertical gradients; and
term VIII of the dynamic layer cost function is a second constraint of the vertical gradient constraints for constraining analysis to the EOF-mode salinity vertical gradients.

8. The method as in claim 1 wherein each of the synthetic sound speed profiles is aligned to the corresponding observed profile within less than 5 meters per second.

9. The method as in claim 2 further comprising the step of:
constructing the surface layer to match the ocean observational data and subsurface layer properties at the MLD.

10. The method as in claim 2 further comprising the step of:
constructing the deep ocean layer based on an exponential decay scheme between subsurface layer properties adjacent to the deep ocean layer and deep ocean climatological data.

11. A system for constructing synthetic sound speed profiles comprising:
an ocean property identifier identifying ocean observational data that includes temperature and salinity measurements for an ocean location;
an ocean layer processor generating, based on the ocean observation data a plurality of layers throughout the depth of the ocean at the ocean location, wherein the plurality of layers includes a surface layer, a mixed layer, a dynamic layer, and a deep ocean layer;
an interface processor identifying an interface between each of the plurality of layers, each of the interfaces occurring at an interface ocean depth;
a constraint processor applying a dynamic layer cost function to the dynamic layer to compute vertical gradient constraints based on a vertical gradient of the ocean observational data and other constraints in each of the plurality of layers, wherein the vertical gradient constraints are incorporated into the synthetic sound speed profiles and include:
first guess temperature and salinity fields for constraining the surface layer,
observed temperature at the mixed layer depth for constraining the mixed layer, and
observed subsurface temperature and salinity for constraining the deep ocean layer;
a dynamic layer processor creating a dynamic layer profile based on the dynamic layer cost function and then applying the vertical gradient constraints to constrain the dynamic layer profile;
a surface/deep ocean processor creating at least one layer profile based on the dynamic layer profile and then applying the vertical gradient constraints to constrain the at least one layer profile;
a profile creator combining the dynamic layer profile and the at least one layer profile to construct the synthetic sound speed profiles, wherein each of the synthetic sound speed profiles is aligned to a corresponding observed profile, within less than 8 meters per second; and
a non-transitory computer-readable medium:
using the synthetic sound speed profile to generate a three-dimensional synthetic model of temperature and salinity at the ocean location, wherein each of the plurality of layers represented in the three-dimensional synthetic model is constrained by at least one of the vertical gradient constraints; and
generating an ocean forecast that accounts for the vertical gradient based on the three-dimensional synthetic model.

12. The system as in claim 11 wherein:
the surface layer has a surface layer temperature profile and a surface layer salinity profile;
the dynamic layer has a dynamic layer temperature profile and a dynamic layer salinity profile; and
the deep ocean layer has a deep ocean temperature profile and deep ocean salinity profile.

13. The system as in claim 11 wherein the ocean layer processor computes each of the interface ocean depths based on the ocean observational data.

14. The system as in claim 11 wherein the vertical gradient constraints constrain the vertical gradient to at least one gradient selected from a group consisting of background gradients, first guess gradients, empirical orthogonal function (EOF) mode temperature vertical gradients, and EOF-mode salinity vertical gradients.

15. The system as in claim 14 wherein the constraint processor selects the vertical gradient constraints from a group consisting of climatological temperature and salinity fields, vertical gradient of the climatological temperature and salinity fields, the first guess temperature and salinity fields, vertical gradient of the first guess temperature and salinity fields, plurality of EOF-mode representation of the temperature and salinity fields, vertical gradient of the plurality of EOF-mode representation of the temperature and salinity fields, the observed temperature at the mixed layer depth, observed sea surface height anomaly, the observed subsurface temperature, and observed subsurface salinity.

16. The system as in claim 11 wherein the dynamic layer cost function comprises:

$$\begin{aligned} J = \quad & (x - x_b)^T B^{-1}(x - x_b) + & \text{I} \\ & (d - d_b)^T E^{-1}(d - d_b) + & \text{II} \\ & (x_{fg} - x)^T R^{-1}(x_{fg} - x) + & \text{III} \\ & (d_{fg} - d)^T P^{-1}(d_{fg} - d) + & \text{IV} \\ & \sum_{i=1}^{N} \left(\frac{T'_i - \hat{T}'_i}{u_i}\right)^2 + & \text{V} \\ & \sum_{i=1}^{N-1} \left(\frac{(T'_{i+1} - T'_i) - (\hat{T}'_{i+1} - \hat{T}'_i)}{w_i}\right)^2 + & \text{VI} \end{aligned}$$

-continued $$\sum_{i=1}^{N}\left(\frac{S'_i - \hat{S}'_i}{u_{i+N}}\right)^2 + \quad \text{VII}$$

$$\sum_{i=1}^{N-1}\left(\frac{(S'_{i+1} - S'_i) - (\hat{S}'_{i+1} - \hat{S}'_i)}{w_{i+N-1}}\right)^2 + \quad \text{VIII}$$

$$\frac{(\tilde{T}'_{MLD} - \hat{T}'_{MLD})^2}{\varepsilon_{SST}^2} + \quad \text{IX}$$

$$\frac{(\tilde{h}_{MLD} - \hat{h}_{MLD})^2}{\varepsilon_h^2} + \quad \text{X}$$

$$\sum_{j=1}^{N_T}\frac{(\tilde{T}'_{i_T(j)} - \hat{T}'_{i_T(j)})^2}{\varepsilon_{T,i_T(j)}^2} + \quad \text{XI}$$

$$\sum_{j=1}^{N_S}\frac{(\tilde{S}'_{i_S(j)} - \hat{S}'_{i_S(j)})^2}{\varepsilon_{S,i_S(j)}^2} \quad \text{XII.}$$

17. The system as in claim 16 wherein:
term II of the dynamic layer cost function is a first constraint of the vertical gradient constraints for constraining the vertical gradient to the background gradients;
term IV of the dynamic layer cost function is a second constraint of the vertical gradient constraints for constraining the vertical gradient to the first guess gradients;
term VI of the dynamic layer cost function is a second constraint of the vertical gradient constraints for constraining analysis to the EOE-mode temperature vertical gradients; and
term VIII of the dynamic layer cost function is a second constraint of the vertical gradient constraints for constraining analysis to the EOF-mode salinity vertical gradients.

18. The system as in claim 1 wherein each of the synthetic sound speed profiles is aligned to the corresponding observed profile within less than 5 meters per second.

19. The system as in claim 12 wherein the profile creator computes the surface layer profile to match the ocean observational data and properties of a subsurface layer at the MLD.

20. The system as in claim 12 wherein the profile creator automatically computes the deep ocean layer profile based on an exponential decay scheme between properties of a subsurface layer adjacent to the deep ocean layer and deep ocean climatological data.

* * * * *